J. L. GARVER.
RESILIENT WHEEL.
APPLICATION FILED APR. 17, 1915. RENEWED MAY 8, 1918.

1,289,726.

Patented Dec. 31, 1918.

Inventor
James L. Garver
By his Attorney
H. Parker Smith

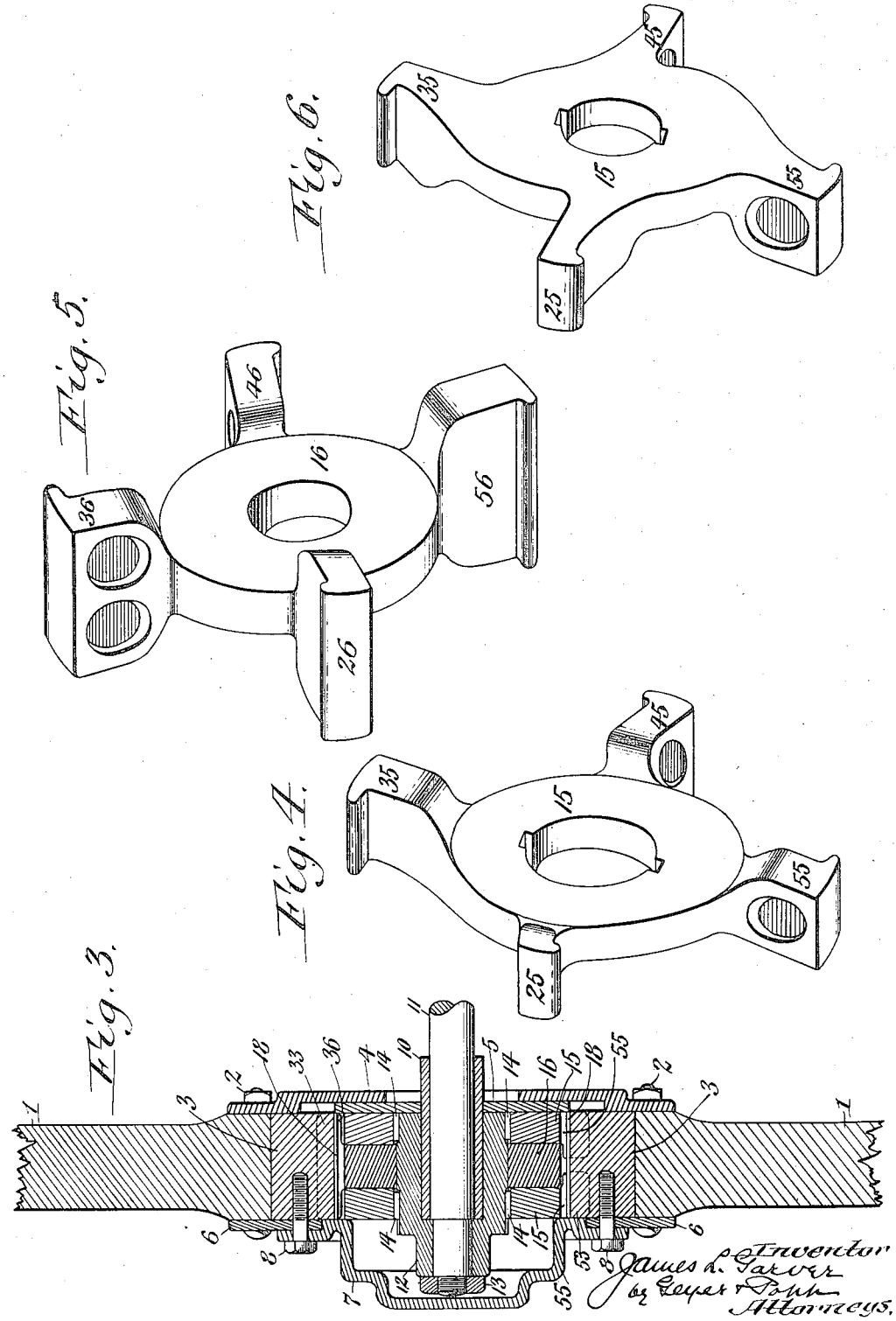

UNITED STATES PATENT OFFICE.

JAMES L. GARVER, OF NEW YORK, N. Y.

RESILIENT WHEEL.

1,289,726.  Specification of Letters Patent.  Patented Dec. 31, 1918.

Application filed April 17, 1915, Serial No. 22,174. Renewed May 8, 1918. Serial No. 233,372.

*To all whom it may concern:*

Be it known that I, JAMES L. GARVER, a citizen of the United States of America, residing at New York city, county and State of New York, have invented certain new and useful Improvements in Resilient Wheels, of which the following is a specification.

My invention relates to resilient wheels and driving apparatus therefor, and in the present embodiment comprises a centrally recessed hub in which is normally centered an axle of suitable design for supporting the weight of the vehicle and transmitting a rotating driving force to the hub and wheel by means of a plurality of springs or other resilient devices mounted in the hub recess. The resilient devices are so designed that the axle is normally centered in said hub under the maximum dead load, or any predetermined part thereof, which the vehicle is designed to carry, but is displaced from such central position, flexing the springs, when the wheel is subjected to radial shocks as by inequalities in the roadbed. In the preferred form of apparatus here illustrated all of said springs are equally flexed by any such displacement, as well as by any driving stress of sufficient force.

The best form of apparatus at present known to me embodying my invention is illustrated in the accompanying sheet of drawings in which:

Fig. 3 is a vertical section taken on line 3—3, Fig. 1. Figs. 4, 5 and 6 are detached perspective views of the inner, intermediate and outer spiders, respectively, forming part of the resilient wheel.

Throughout the drawings like reference characters indicate like parts.

Figure 1:
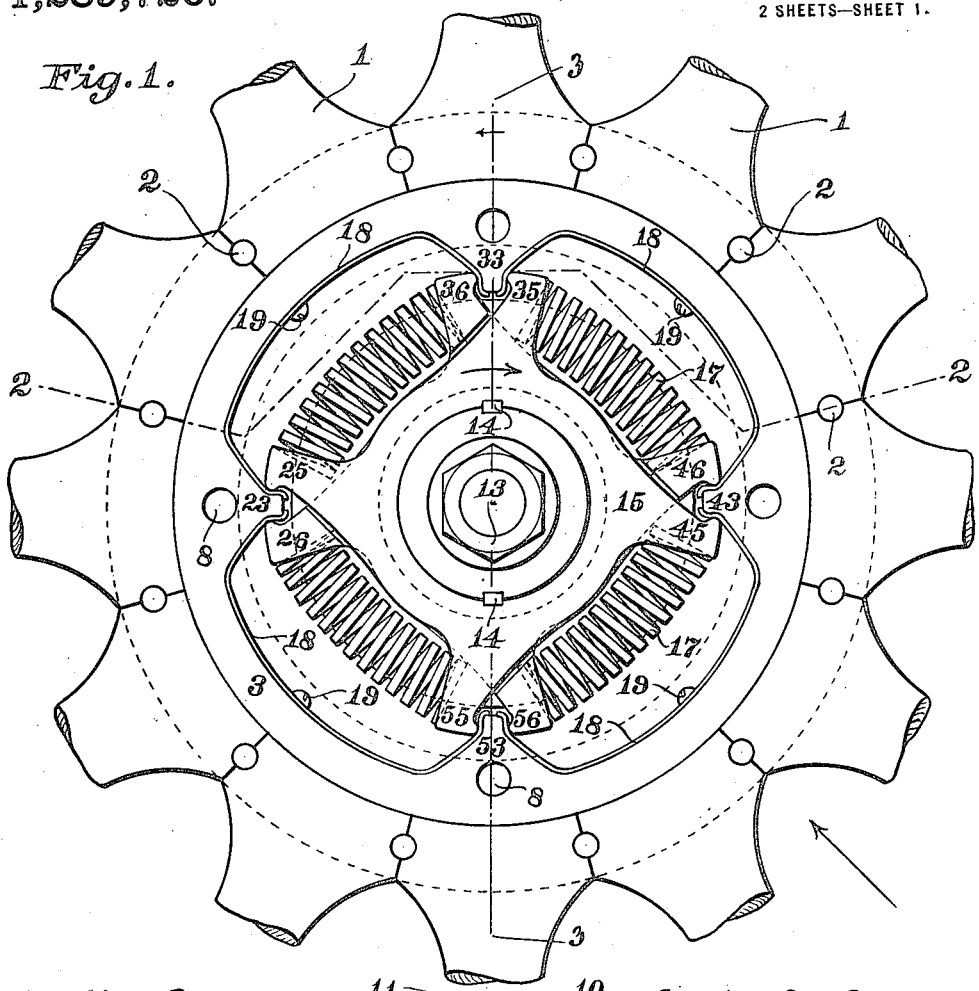
Figure 1 is a side elevation of a hub with spokes broken away and the cap plate removed.
Figure 2:
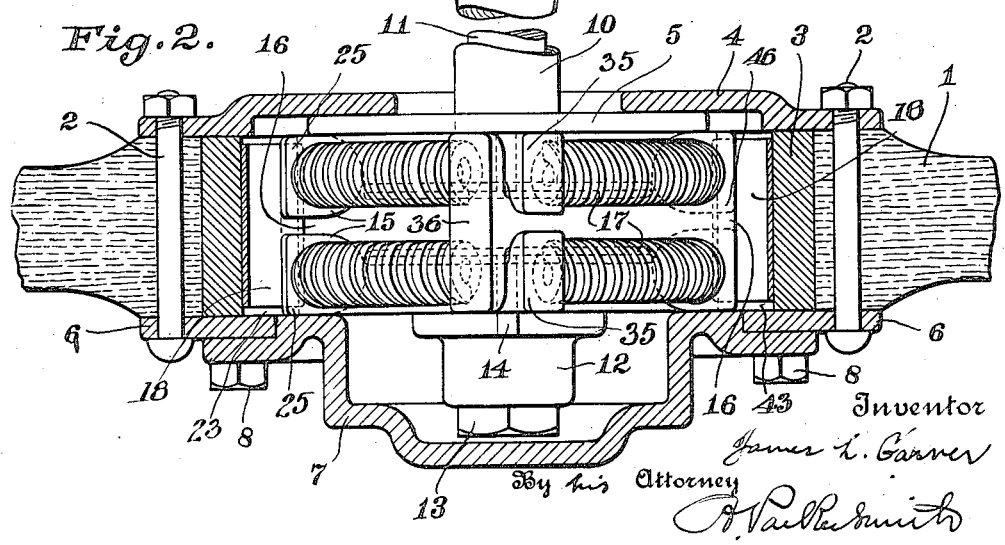
Fig. 2 is a horizontal section taken on the irregular line 2—2 of Fig. 1.

1, 1, are spokes held, by bolts 2, 2, passing through back ring 4, and front ring 6, in a position radial to hub cylinder or ring 3. A back plate 5, usually rigid on tubular weight-bearing axle 10, closes the inner end of the hub, while the outer or front end is closed by cap 7. Bolts 8, 8, hold cap 7, and ring 6, together and to hub ring 3.

Inside tubular axle 10, is the floating, live or driving axle 11, which is rigidly connected to the reversed driving cap-sleeve 12, by nut 13, or equivalent fastening means. This driving cap-sleeve is rotatably mounted on the exterior of the end portion of tubular axle 10, having any suitable anti-friction bearing thereon, not shown. It can be rotated thereon by torsional driving stresses transmitted through live axle 11.

On the driving cap-sleeve 12, are rigidly mounted one or more fixed spiders 15, 15, as by keys 14, 14, so that said spiders are rigidly connected to live axle 11. On the driving cap-sleeve 12, and preferably between the two spiders 15, 15, is loosely mounted a floating spider 16, having a plurality of radial arms, jaws or lugs. I have shown four such arms, 26, 36, 46 and 56. The outer extremities of these arms are constructed in the form of cross heads, extending parallel to the axles, and opposite to radially extending arms 25, 35, 45 and 55, on fixed spiders 15, 15. The hub ring 3, has an equal number of lugs 23, 33, 43 and 53, extending radially inward, one between each pair of opposing arms 25, 26; 35, 36, etc., of the rigid and floating spiders. Preferably the sides or flanks of these lugs 23, 33, etc., have resilient facing strips such as leaf springs 18, 18, held in position by screws 19, 19, or equivalent fastening means, and normally tending to spring away from the lug faces. A plurality of resilient compression devices, such as the spiral springs 17, 17, are held and compressed between the rigid spider and floating spider so as to resist relative rotation of the same in one direction, while tending to produce such relative rotation in the other direction. As shown, there are two sets of such springs, one mounted between the arms of the inside fixed spider 15, and the rear ends of cross heads 26, 36, 46, 56, of the floating spider 16, and the other mounted between the arms of the outside fixed spider 15, and the front ends of said cross heads.

The operation of the above described apparatus may be set out as follows: The springs 17, are compressed by their confinement above described sufficiently to resist flexure by the weight of the maximum predetermined dead load on tubular axle 10, and so maintain said axle centered in the hub recess while the wheel is at rest or traveling over a smooth roadbed. But when the wheel rises suddenly over an obstacle, or is otherwise subjected to a roadbed shock transmitted radially to the axle, the force of said shock will cause a flexing of the springs 17, 17, in the following described manner.

If the thrust is vertically upward while the parts are in the position shown in Fig. 1, the arms 25, 25, of spiders 15, 15, and the arm 46 of spider 16, are slightly lifted by lugs 23, and 43, of the hub. This causes relative rotation of spider 15, with reference to spider 16, slightly opening each pair of jaws 25, 26; 35, 36; 45, 46, and 55, 56, and causing arm 25 to approach arm 36, arm 35 to approach arm 46, and so on around the spiders, equally flexing springs 17, 17, to an extent sufficient to absorb and resist the shock. The rising of the hub forces the lowest lug 53, farther up into the opening jaws, 55, 56, but, as the profile of each lug is such as to cause its flank surface to approximately correspond to the travel-paths of the arm faces relative to it, there is no jamming action between arms and lug flanks and only a resilient resistance to the relative motions of the parts is encountered. As the axis of the axle forming the mathematical hinge pivot connecting arms 25 and 46 is normally slightly below the straight line joining bearing faces of the arms 25 and 46, said arms will move slightly toward one another when springs are compressed, sliding over lug faces 23, and 43. The jaw-like action of arms 55, 56, above described, prevents any excess of movement to right or left, and compels the spider system to move along a radial line.

As the arms 26, 45, 36 and 35 are forced away from the side faces of lugs 23, 43 and 33, respectively by the movements of the parts, the leaf springs 18, 18, follow them and cushion their return movements when the springs 17, 17, react and force the parts back again into the position shown in Fig. 1. Upon a continued reverse movement of relative rotation between the spiders due to the momentum of all moving parts, the arms 25, 46, 55 and 56 will move away from their coöperating lugs 23, 43 and 53, and a jaw-like movement of arms 36, 35, up along the flanks of lugs 33, will occur, again flexing springs 17, 17, until they check and reverse this second movement. This vibration of parts and springs will continue until they come to rest, or are subjected to the action of new forces.

If a radial shock is given the hub along the line of the straight arrow, Fig. 1, it will be taken up by spider arms 55, 46, which will slide slightly farther apart along the flanks of lugs 53 and 43. The arms 56 and 45, will approach slightly nearer each other moving down the flanks of lugs 53 and 43, while arms 36, 35, will be slightly withdrawn from contact with lug 33, and arms 26 and 25 from lug 23. The leaf springs 18, 18, will follow the receding arms in each case as before and cushion their return movements. In this, as in every other case, all the springs 17, 17, will be equally flexed and each shock equally distributed among all of them.

When the parts are at rest the portion of the weight of the vehicle body borne by the end of axle 10, extending into the recess in hub 3, is equally divided between the arms 25, 25, of fixed spiders 15, 15, and the arm 46, of floating spider 16, which become bell crank arms pivoted on axle 10, held in position by the springs 17, 17 and resting on lugs 23, 43. When any torsional driving stress is transmitted by live axle 11, and driving cap-sleeve 12, to fixed spiders 15, 15, in the direction of the curved arrow, Fig. 1, it is transmitted by springs 17, (all acting equally) to the crossheads of floating spider 16, and through them to lugs 23, 33, 43 and 53, of the hub, rotating the wheel. If said driving stress becomes great enough, in conjunction with the load stresses on springs 17, 17, to flex same, the fixed spiders 15, 15, will swing a little downwardly around the point of contact between arms 25, 25, and lug 23, as a center, while the floating spider 16, will swing downwardly to the same extent in the reverse direction around the point of contact between arm 46, and lug 43, as a center. These movements will continue until the total stress is absorbed by the flexing of springs 17, 17, in the same manner as the excess load stresses are absorbed as before described. During such flexure the entire driving stress is transmitted to the hub through arm 46, and lug 43, (or is divided between that bearing and that of arm 56, on lug 53, if the profile of lug 53, is shaped exactly right to maintain its contact with arm 56 throughout the movement of the latter). Of course, as the leaf springs 18, follow and maintain contact with the receding arms 36, and 26, a small portion of the driving stress is transmitted through them to the hub, but they are so weak that the part they transmit is practically negligible, their main function being to cushion the return of the arms to their seats on the lugs and to prevent clicking noises and pounding together of the contact surfaces. Speaking generally, therefore, when the axle is centered, load stresses are divided between arms in the positions of 25 and 46, and lugs 23 and 43, while forward driving stresses are transmitted from the fixed spiders through springs 17, 17, to all floating spider arms and all hub lugs, but when an axle is forced out of center by excess load or driving stresses, or by both combined, the load stresses are equally divided as before, while practically all the driving stress is transmitted through the lug which happens to be in or near position 43, as shown in Fig. 1.

When the driving stresses are reversed, as in backing the vehicle, they are transmitted directly from fixed spiders, 15, 15, to all hub lugs, if the axle is centered in the hub, or through the arm in the position of 25, to hub lug 23, alone, if the axle is being forced downwardly out of center by an excess vehicle load or roadbed shock. During such reversal of driving force, the springs 17, 17, are unaffected by driving stresses if the axle is centered and merely receives the stresses due to load and roadbed shocks. But if the axle is out of center, the reverse driving stresses relieve the load and shock stresses in part or whole.

The advantages of my invention comprise mainly the double cushioning action of the springs opposed to both load and driving stresses, and the equal division of all stresses between a plurality of springs under all conditions of load and drive. With the eight spiral springs shown, every stress is divided into eight equal parts, one to each spring, no matter how much the parts may be distorted from their normal centered position in the hub. By increasing the number of spider arms, hub lugs, and springs 17, the stresses can be further divided. If the total load on an axle is two tons, each axle end will carry one ton with the arrangement shown, and each spring 17 will carry only two hundred and fifty pounds. Springs can easily be designed to carry these and all reasonable excess stresses without flexing enough to permit unyielding members to strike one another. Also the parts can be easily and uniformly lubricated by packing the hub cavity with grease. They are all protected from dirt, as the construction is compact, simple, cheap and self contained. All bearing surfaces carrying loads have relative turning movements mainly, rather than relative sliding motions of any appreciable extent, so that friction and wear are reduced to a minimum.

The maintaining of the axle centered in the hub under normal conditions eradicates all relative movements of the parts and so avoids friction and wear, except when roadbed shocks require movement of the parts. The resilient force of all the springs acting as a sum total on the spiders, exact uniformity of elastic thrust among the different springs is not required. The action of the parts will be just as even if one pair of springs 17, should be twice as strong as any other pair, as it would if all springs were calibrated to exact uniformity. Consequently springs may be removed freely and replaced by others when necessary, and if one or more springs break in use, the apparatus will operate as evenly, distributing the stresses merely over the remaining springs, though the sum total of resilience will be reduced proportionately throughout. Finally, the broad bearings of the spiders and plate 5, on the inner and outer hub plates give the wheel mounting great rigidity to resist side strains, such as arise when the vehicle skids sidewise or turns corners rapidly.

Various changes could be made in the details of construction here illustrated and described to meet varying conditions of use without departing from the underlying novel principles of the invention. Thus the number of spiders, spider arms, resilient members, hub lugs, etc., could be varied, and the contour of the parts, and the manner of building up the hub, changed, and other modifications made without going beyond the scope of my invention.

It is obvious that the advantages of my invention are also obtainable in a wheel in which the hub is mounted loosely on the axle instead of being secured thereto, as shown in the drawings.

Having described my invention, I claim:

1. A resilient wheel comprising an outer wheel member, an inner wheel member having coaxially arranged parts revoluble relatively to each other in opposite directions and also revoluble relatively to said outer wheel member, said inner member parts adapted to engage said outer wheel member and to be held thereby against rotation relatively to each other in one direction and also relatively to said outer wheel member each in one direction, and resilient elements which oppose the rotation of said inner member parts in the opposite direction relatively to each other.

2. In a resilient wheel, the combination of a centrally recessed hub having a plurality of internal, radially and inwardly projecting lugs, a tubular, non-rotating, weight-bearing axle projecting into the recess in said hub, a floating, rotating live or driving axle in said tubular axle, a spider rigidly connected to said driving axle and having arms normally engaging the hub lugs on corresponding side faces thereof, a floating spider having an equal number of arms normally engaging the hub lugs upon their other side faces and a plurality of compression springs confined between the arms of the two spiders.

3. In a resilient wheel, the combination of a centrally recessed hub having a plurality of internal, radially and inwardly projecting lugs, a tubular, non-rotating, weight-bearing axle projecting into the recess in said hub, a floating, rotating, live or driving axle in said tubular axle, a driving cap-sleeve fixedly mounted on the end of the driving axle and extending over the end of the fixed tubular axle, a pair of spiders fixedly mounted on said driving sleeve and having arms normally engaging the hub lugs on corresponding side faces thereof, a third spider loosely mounted on the driving cap-sleeve between the two fixed spiders and having an equal number of arms provided with cross heads extending opposite to the arms of the fixed spiders and normally engaging the lugs upon their opposite faces, and a plurality of compression springs confined between the arms of the fixed spiders, and the cross heads on the arms of the floating spider.

4. In a resilient wheel, the combination of a centrally recessed hub having a plurality of internal, radially and inwardly projecting lugs, a tubular, non-rotating, weight-bearing axle projecting into the recess in said hub, a floating, rotating, live or driving axle in said tubular axle, a spider rigidly connected to said driving axle and having arms normally engaging the hub lugs on corresponding side faces thereof, a floating spider having an equal number of arms normally engaging the hug lugs upon their other side faces, and a plurality of compression springs confined between the arms of the two spiders, together with resilient facing strips interposed between the side faces of said lugs and the spider arms.

5. In a resilient wheel, the combination of a centrally recessed hub having a plurality of internal, radially and inwardly projecting lugs, a tubular, non-rotating, weight-bearing axle projecting into the recess in said hub, a floating, rotating live or driving axle in said tubular axle, a spider rigidly connected to said driving axle and having arms normally engaging the hub lugs on corresponding side faces thereof, a floating spider having an equal number of arms normally engaging the hub lugs upon their other side faces, and a resilient means tending to produce relative rotation of the spiders in opposite directions so as to normally grip all the lugs between the opposing arms of the spiders.

6. In a resilient wheel, the combination of a centrally recessed hub having a plurality of internal, radially and inwardly projecting lugs, a tubular, non-rotating weight-bearing axle projecting into the recess in said hub, a floating, rotating, live or driving axle in said tubular axle, a spider rigidly connected to said driving axle and having arms normally engaging the hub lugs on corresponding side faces thereof, a floating spider having an equal number of arms normally engaging the hub lugs upon their other side faces, and resilient means tending to produce relative rotation of the spiders in opposite directions so as to normally grip all the lugs between the opposing arms of the spiders, said lugs having uniform profiles which correspond approximately to the paths followed by the members of any pair of opposing spider arms when the axles are forced toward that lug and the said spider arms are forced downwardly along the faces of such lug.

7. In a resilient wheel, the combination of a centrally recessed hub, an axle normally mounted in the center of said hub recess, engaging means whereby partial relative rotation in one direction between the two is permitted but all such rotation in the other direction is prevented, and a plurality of circumferentially arranged springs located in said recess, each of which springs is operatively connected at one end to the axle, and at the other end to the hub, the tension of said springs being such as to prevent flexing under the maximum normal predetermined dead load applied to the axle but to permit flexing under the additional force of roadbed shocks applied radially to the hub or torsional driving stresses applied to the axle.

8. In a resilient wheel, the combination of a centrally recessed hub having a plurality of internal, radially and inwardly projecting lugs, a tubular, non-rotating, weight-bearing axle projecting into the recess in said hub, a floating, rotating, live or driving axle in said tubular axle, a plurality of spiders connected to said axles in said hub recess and having arms engaging said hub lugs, resilient means permitting partial relative rotation of said spiders, an annular plate mounted on the tubular axle and bearing on the outer spider at one end of the hub, a second annular plate outside of the first and fastened to the hub, and a cap plate mounted on the other end of the hub and bearing on the outer spider at that end, whereby any relative movement between axle and hub endwise of the axle is prevented and the plane of rotation of the hubs is maintained perpendicular to the axis of the axle.

9. A resilient wheel comprising a plurality of inner members which are mounted to turn coaxially relatively to each other, an outer member provided with bearings which are engaged by said inner members, and resilient elements which are arranged in the plane of the wheel and which yieldingly resist the relative movement of said inner members in one direction and operate to turn said inner members to their normal relative position.

10. A resilient wheel comprising a plurality of inner members which are mounted to turn coaxially relatively to each other, an outer member provided with bearings which are engaged by said inner members, and resilient elements which are arranged in the plane of the wheel and which yieldingly resist the relative movement of said inner members in one direction and hold the same yieldingly in engagement with said bearings and operate to turn said inner members to their normal relative position.

11. A resilient wheel comprising a plurality of inner members which are mounted to turn coaxially relatively to each other, an outer member provided with bearings which are engaged by said inner members, and resilient elements which are arranged in the plane of the wheel and which are interposed between said inner members and yieldingly resist relative movement of the same in one direction and also hold the same yieldingly in engagement with said bearings and operate to turn said inner members to their normal relative position.

12. A resilient wheel comprising an outer annular member provided on its inner side with a plurality of bearing lugs arranged at different points around its axis, a plurality of inner members mounted to turn about the same axis which is normally concentric with the axis of said outer member and each of said inner members being provided at different points around its axis with a plurality of bearing arms, the arms of one inner member engaging said bearing lugs circumferentially in one direction and the arms of the other inner members engaging said bearing lugs circumferentially in the opposite direction, and resilient elements operating to hold said inner members with their arms yieldingly in engagement with said bearing lugs.

13. A resilient wheel comprising an outer annular member provided on its inner side with a plurality of bearing lugs arranged at different points around its axis, a plurality of inner members mounted to turn about the same axis which is normally concentric with the axis of said outer member and each of said inner members being provided at different points around its axis with a plurality of bearing arms, the arms of one inner member engaging said bearing lugs circumferentially in one direction and the arms of the other inner members engaging said bearing lugs circumferentially in the opposite direction and resilient elements interposed between adjacent arms of said inner members and operating to hold said inner members with their arms yieldingly in engagement with said bearing lugs and also yieldingly resisting movement of said inner members in one direction relative to each other.

14. A resilient wheel comprising an outer annular member provided on its inner side with a plurality of bearing lugs arranged at different points around its axis, a plurality of inner members mounted to turn about the same axis which is normally concentric with the axis of said outer member and each of said inner members being provided at different points around its axis with a plurality of bearing arms, the arms of one inner member engaging said bearing lugs circumferentially in one direction and the arms of the other inner members engaging said bearing lugs circumferentially in the opposite direction, resilient elements interposed between adjacent arms of said inner members and operating to hold said inner members with their arms yieldingly in engagement with said bearing lugs and also yieldingly resisting movement of said inner members in one direction relative to each other and means for holding said inner and outer members against displacement relative to each other in a direction parallel with the axes thereof.

15. A resilient wheel comprising an outer wheel member, a central hub portion divided into a plurality of grip like members or parts adapted to rotate about the same center in opposite directions and provided with bearings about said axis, one bearing of one part and one bearing of the other part forming a pair which engage said outer wheel member and hold said inner and outer members normally in concentric position by a grip like action, and resilient means which are arranged in the plane of the wheel and for yieldingly resisting the opening of said grip like members and operating to return said inner members to their normal relative position.

16. A resilient wheel comprising a central member composed of a plurality of parts acting as levers and arranged to cross each other at the center of the axle, a surrounding wheel member, one end portion of one of said levers fulcruming on one side of said surrounding wheel member and one end portion of the other lever fulcruming on the other side of said surrounding wheel member, and resilient means which resist the movement of said levers away from said surrounding member.

17. In a resilient wheel, the combination of an outer member, an inner member divided into coaxial parts revoluble in opposite directions, resilient elements interposed between said inner member parts, the combined tension of all of said elements holding said inner member normally concentric with said outer member, and means for cushioning the contact of said inner member parts on said outer member.

18. In a resilient wheel, an axle, a rim, and devices including resilient elements for supporting said axle from said rim, said resilient elements being so constructed and arranged that all similarly located resilient elements are moved simultaneously and uniformly by forces exerted circumferentially in both directions when the wheel is subjected to a load or shock.

19. In a resilient wheel, a continuous rim, an axle, and devices for yieldably supporting said axle from said rim consisting of rotatable members arranged in permanent coaxial relation, together with resilient elements operating uniformly to oppose the rotation of said coaxial members in opposite directions so as to tend to maintain said rim and axle in their normal relative positions.

20. In a resilient wheel, an axle, and devices for supporting said axle comprising a plurality of coaxial members of fixed areas permanently held in coaxial relation, together with resilient devices for yieldably holding said coaxial members against circumferential movement in opposite directions relative to each other, and a single member having an operative connection with said coaxial members.

21. In a wheel, a rim member, an axle member, parts arranged coaxially in said wheel operatively associated with said rim and axle members, and resilient means arranged to impel said coaxial parts in opposite circumferential directions to tend to position said rim and axle members in substantially concentric relation to each other.

22. In a resilient wheel, the combination of a continuous rim member, an axle member, said members being movable radially and circumferentially in respect to each other, resilient devices for connecting said rim and axle members, said devices including a plurality of coaxial members revoluble relative to one another in opposite circumferential directions, whereby a relative radial and circumferential movement of said rim and axle members is yieldably resisted by said resilient devices.

23. In a resilient wheel, the combination of a rim member, an axle member movable relatively thereto both radially and circumferentially, yieldable devices for connecting said rim and axle members, said devices including a plurality of revoluble coaxial parts borne by one of said members and engaging the other of said members in opposite circumferential directions and also including resilient elements whereby the resilient elements of said yieldable devices are influenced by relative radial and circumferential movements of said rim and axle members in either loaded or unloaded condition.

JAMES L. GARVER.